Inventor
MARCEL WALLACE

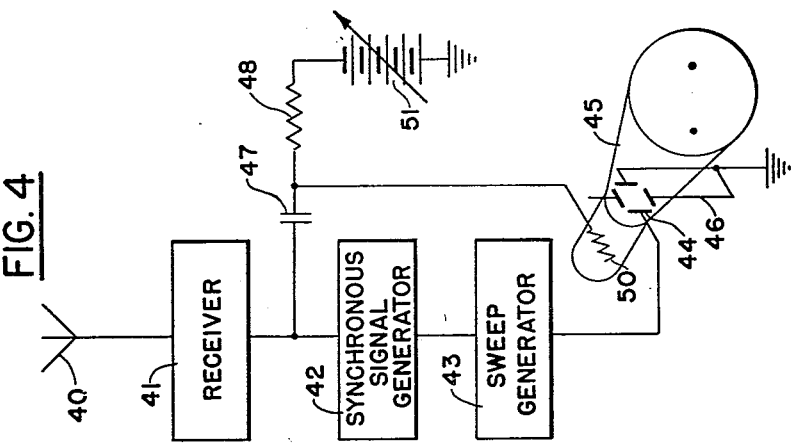
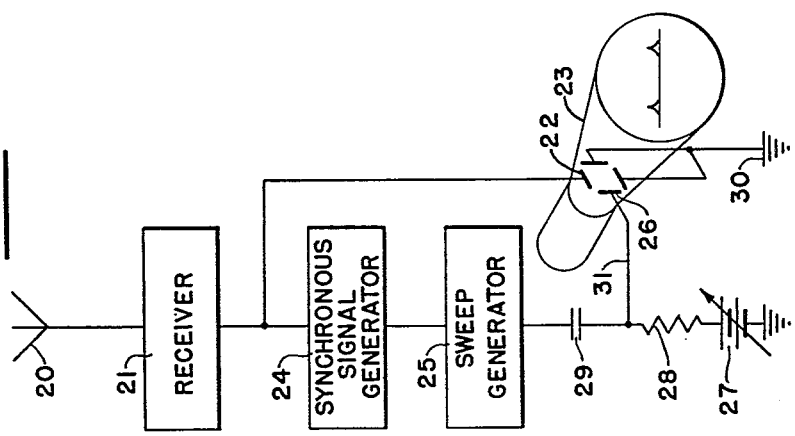
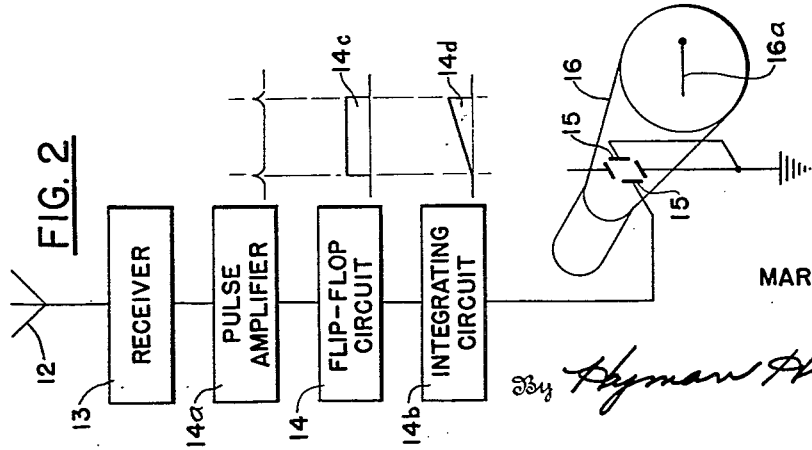

Aug. 5, 1952          M. WALLACE          2,606,317
                    NAVIGATIONAL SYSTEM
Filed April 19, 1946                    7 Sheets-Sheet 3

Inventor
MARCEL WALLACE

Aug. 5, 1952 — M. WALLACE — 2,606,317
NAVIGATIONAL SYSTEM
Filed April 19, 1946 — 7 Sheets-Sheet 4
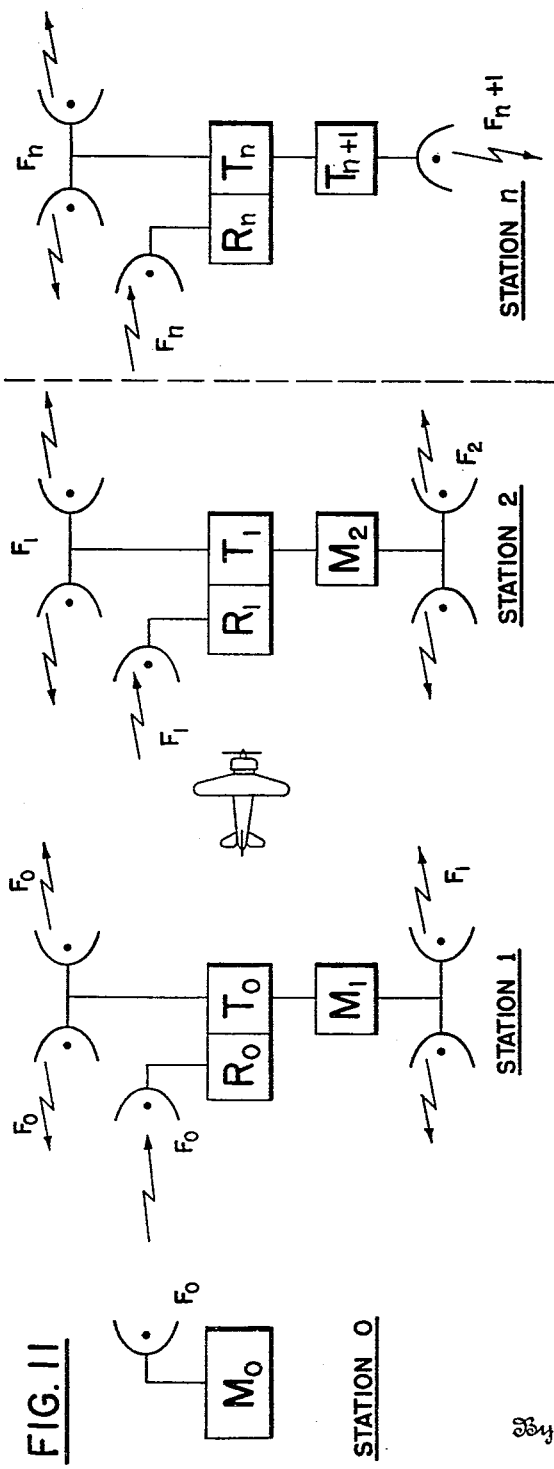
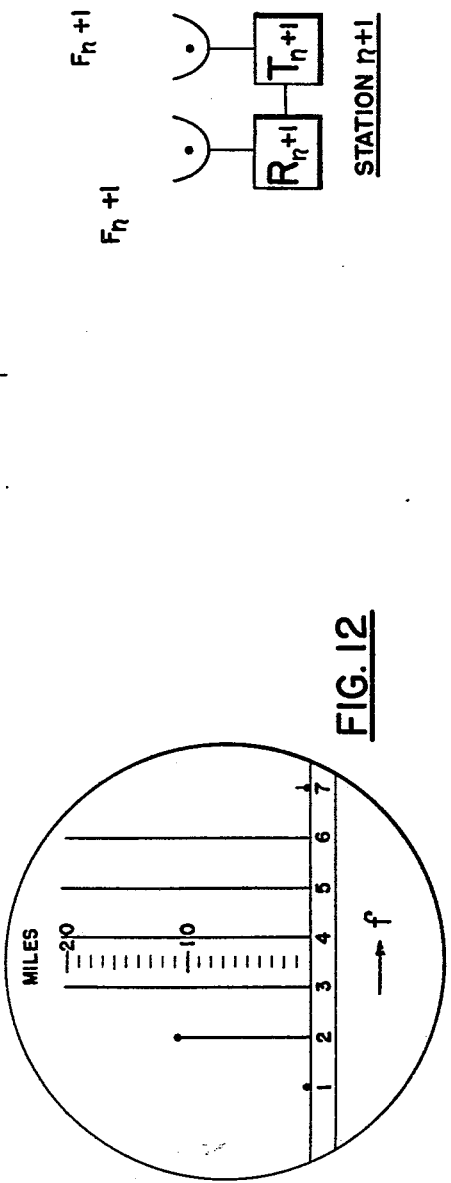
FIG. 12
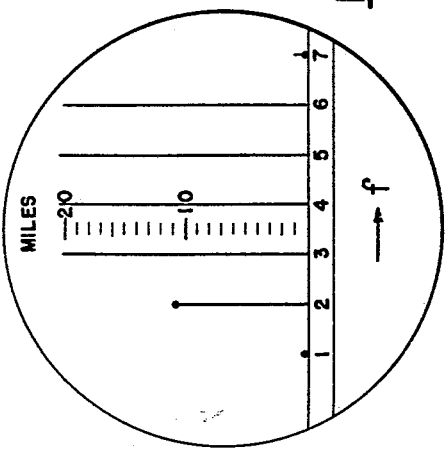
Inventor
MARCEL WALLACE

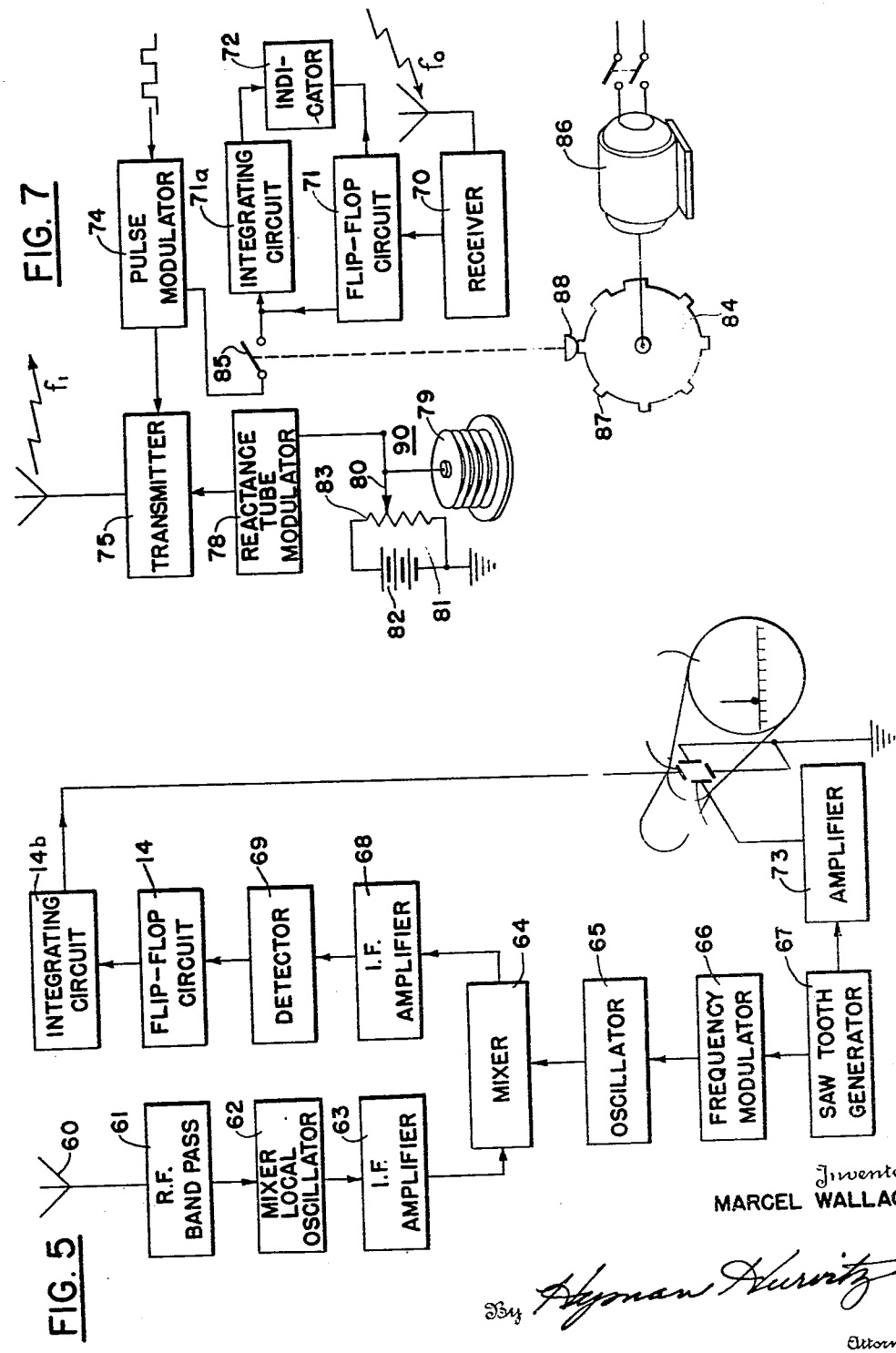

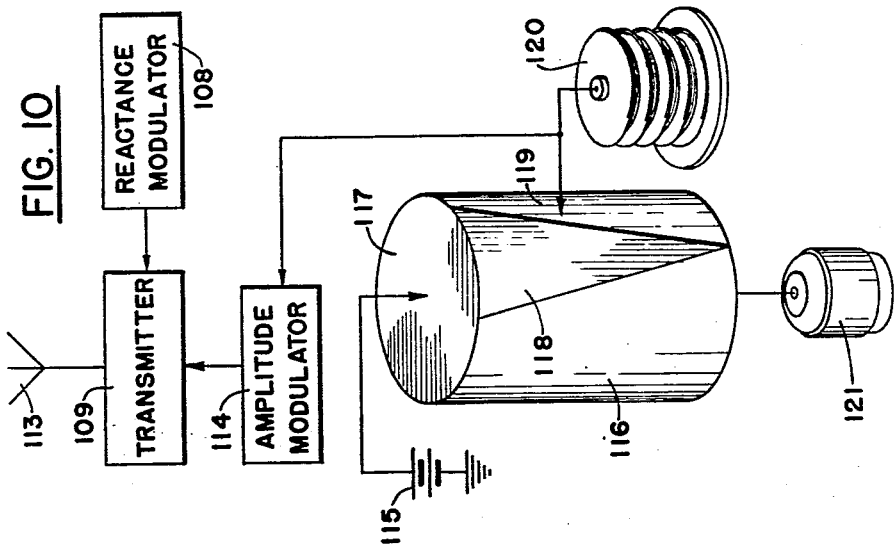
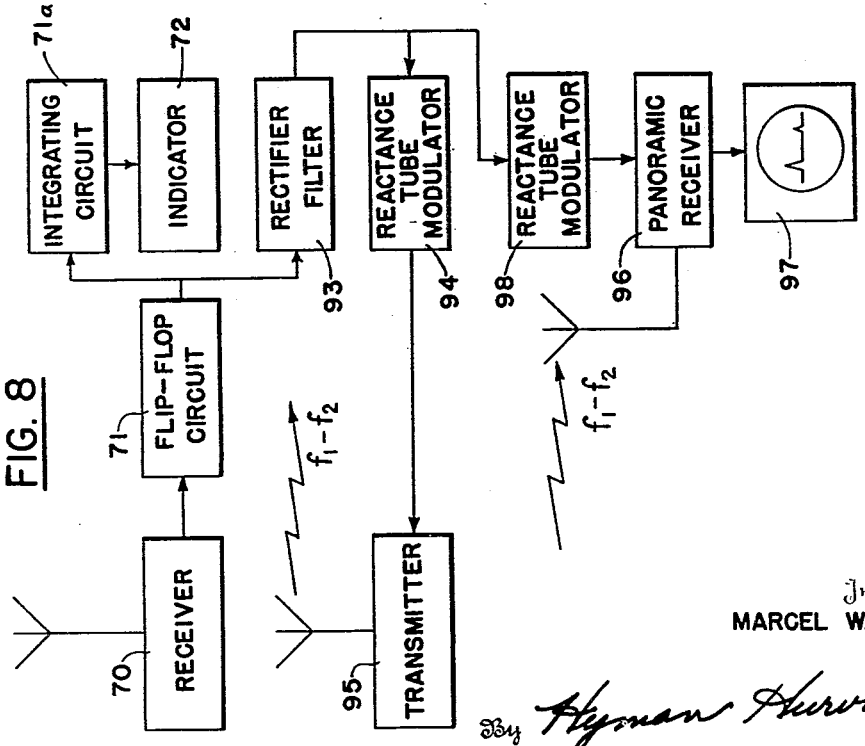

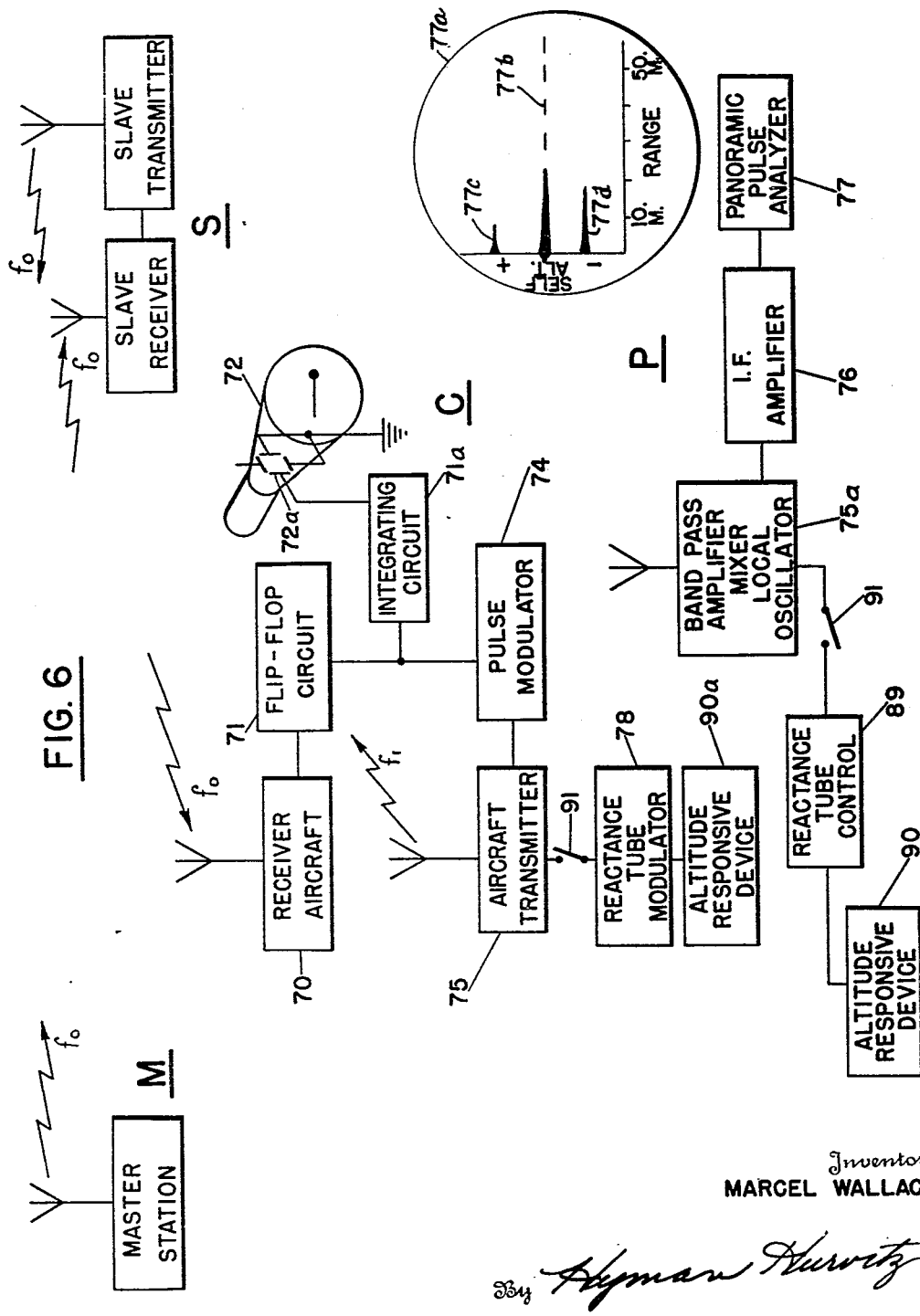

Patented Aug. 5, 1952

2,606,317

UNITED STATES PATENT OFFICE 2,606,317

NAVIGATIONAL SYSTEM

Marcel Wallace, Fairfield County, Conn., assignor, by mesne assignments, of one-half to Marcel Wallace, doing business as Panoramic Laboratories, East Port Chester, Conn.

Application April 19, 1946, Serial No. 663,315

13 Claims. (Cl. 343—6)

This invention relates generally to navigational systems, and particularly to navigational systems for providing each of a plurality of aircraft with various navigational information.

It is to be anticipated that the future development of air travel will require the provision of definite airways along which aircraft will be constrained to travel, much as automobile traffic now is constrained to follow roads. Detailed traffic regulations will be necessary to enable expeditious and safe travel along the airways, and it will be essential that the operator of each craft be provided with continuous information not only of the location of his own craft along the airway, but also of all other craft which are in proximity to his own. In many cases the information desired aboard each craft may concern relative altitudes of all other craft in a given area, and also relative horizontal distances of the other craft.

It is essential in providing a navigational system of the type described above, to keep in mind certain limitations which must be imposed upon the apparatus involved in the system. In particular, cost, complexity and weight of equipment required must be kept to a minimum, if the system is to receive wide-spread acceptance.

It is, accordingly, an object of this invention to provide continuous indications aboard each of a plurality of aircraft, of the distances of each aircraft from a fixed geographical location.

It is a further object of the invention to provide continuous indications aboard each of a plurality of aircraft, of the altitudes of all the aircraft.

It is another object of the invention to provide continuous indications aboard each of a plurality of aircraft, of both the distances of all the craft from a fixed geographical location, and of the altitudes of the craft with respect to sea level.

It is another object of the invention to provide devices aboard an aircraft for continuously indicating the location of that aircraft in both horizontal and vertical dimensions.

It is a further object of the invention to provide a continuous indication of the relative altitudes of a plurality of aircraft flying on a predetermined airway.

Still another object of the invention consists in the provision of a system for informing each of a plurality of aircraft of the relative horizontal proximity of the remainder of the craft.

Another object of the invention resides in the provision of a system for providing an aircraft with information concerning its location relative to a fixed geographic point, by interpreting signals originating at ground stations, and without the necessity of providing transmitting equipment aboard the craft.

It is another object of the invention to provide a continuous indication of the location of a craft along an airway.

It is another object of the invention to provide means for indicating simultaneously the distance of an aircraft from a plurality of identifiable coterminous airway segments, in order to provide unmistakable and readily interpreted indications of location of a craft along airway, which may be many hundreds of miles in length.

It is still another object of the invention to provide a system of navigation which will provide, to a craft flying along a non-rectilinear airway comprised of rectilinear segments, certain adjacent ones of which are oriented at an angle to one another, information of the distance to the next bend in the course, under certain conditions.

It is still a further object of the invention to provide a system for identifying each craft flying on an airway, and for providing certain information as to the course thereof, as well as information concerning the altitude and location thereof along an airway, to all other craft flying along that particular airway.

It is another object of the invention to provide circuits and arrangements for translating elapse of time between pulses into frequency, for certain purposes which will be hereinafter clarified.

This invention also consists in certain combinations and arrangements of parts for carrying out the general objects of the invention, as explained above, which shall be hereinafter fully described, illustrated in the accompanying drawings and specifically pointed out in the appended claims.

In the drawings:

Figure 2 illustrates in schematic block diagram a receiver-indicator system for interpreting signals received from a master-slave pair, such as is illustrated in Figure 1 hereof;

Figure 3 illustrates a modification of the receiver-indicator of Figure 2;

Figure 4 illustrates still a further modification of the receiver-indicator system of Figure 2;

Figure 5 illustrates a panoramic system of analyzing information-bearing signals simultaneously from a plurality of master-slave stations, each master-slave station operating on a different carrier frequency;

Figure 1:
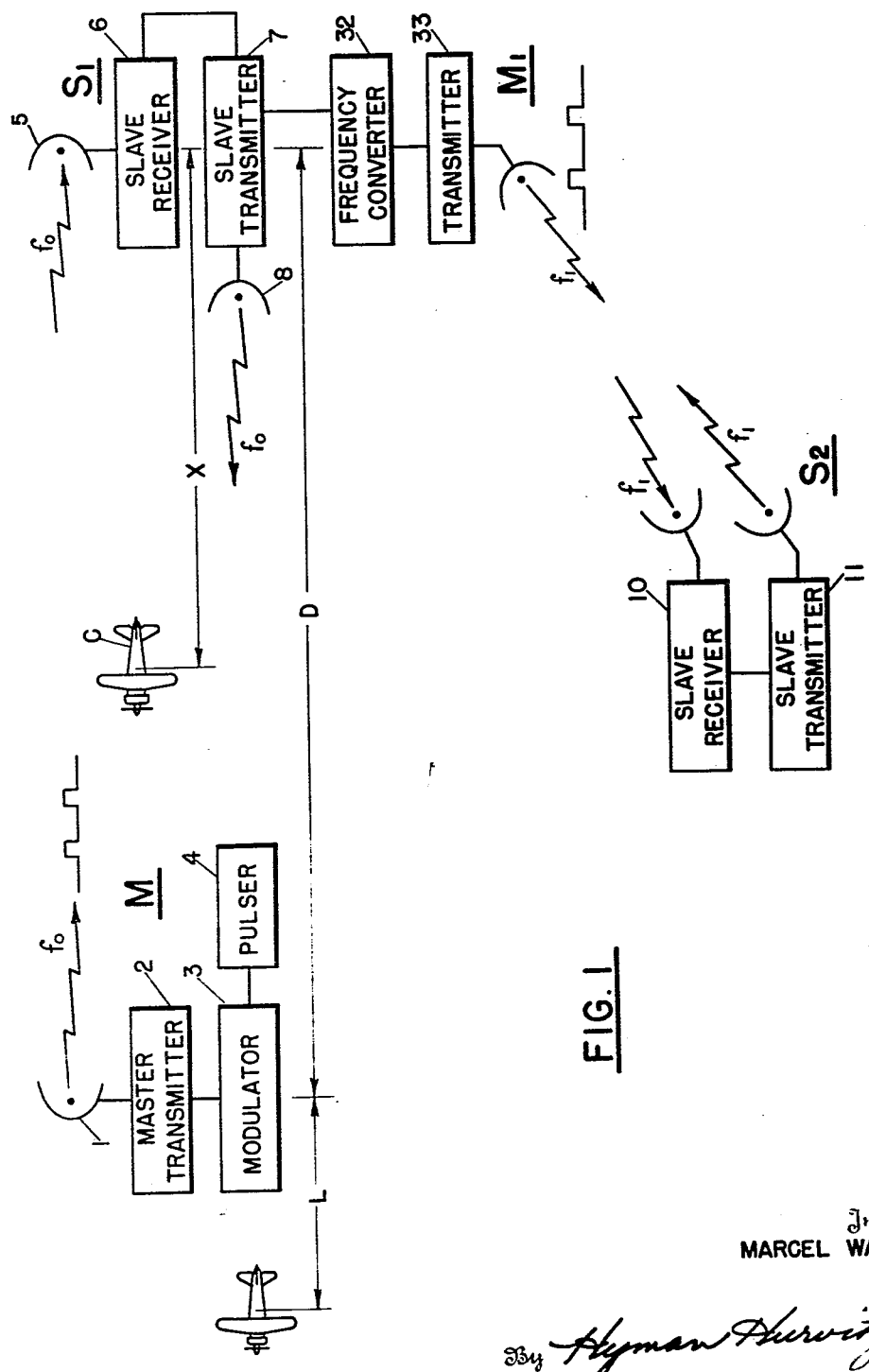
Figure 1 illustrates a system of navigation employing a series of master and slave stations, located along an airway, for transmitting signals to all craft flying along the airway, the signals being interpretable aboard each craft to provide an indication of its location along the airway.
Figure 9:
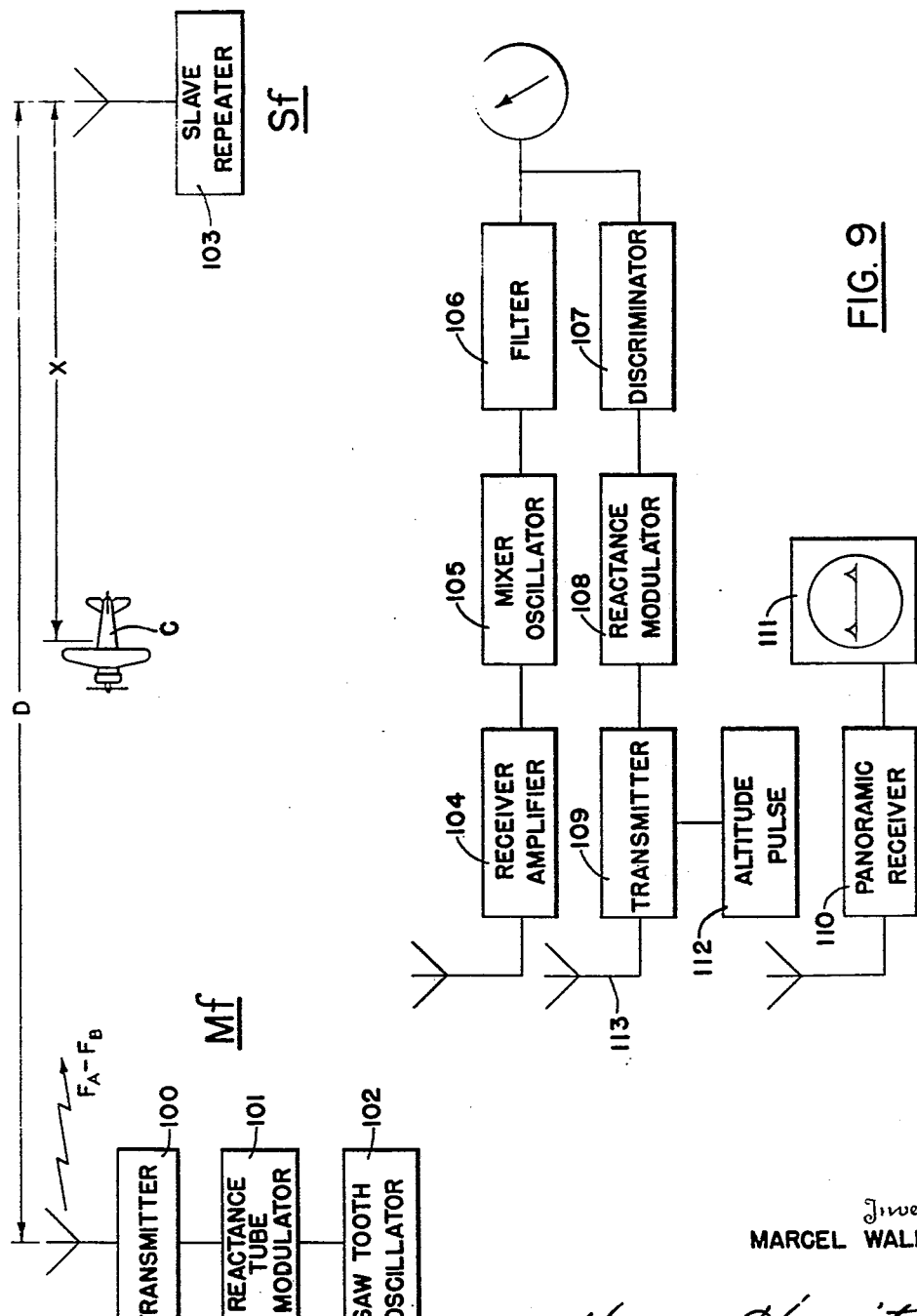

Figure 6 illustrates in schematic block diagram a master-slave pair, a transmitter-receiver-indicator system aboard an aircraft for analyzing signals received from the master-slave pair, for providing an indication of location of the craft, and for transmitting to all adjacent craft signals indicative of the location of the craft, and a receiver-indicator system for analyzing aboard each craft the signals provided by all the craft;

Figure 7 is a schematic block diagram of a transmitter-receiver-indicator system which transmits signals at a carrier frequency indicative of the altitude of the transmitting craft, the carrier being modulated by pulses indicative of the location of the craft along an airway; the receiver-indicator system analyzes and indicates information derived from similar transmissions originating aboard other craft on the airway;

Figure 8 illustrates in schematic block diagram a system for transmitting from each of a plurality of aircraft information concerning the location of that craft on an airway, the information bearing signals aboard each aircraft being received and analyzed aboard all the aircraft;

Figure 9 illustrates in schematic block diagram a system of master-slave stations, for providing radio transmissions interpretable in terms of location, the master station being frequency modulated, rather than pulse modulated, as was the case in the system illustrated in Figure 1 of the drawings;

Figure 10 illustrates a system for modulating a transmitter with pulses having a length proportional to amplitude.

Figure 11 illustrates schematically an airway system provided with a plurality of bidirectionally transmitting master-slave stations, for providing indications aboard aircrafts of the character of the airway and of the distance of the craft from various identification serving points along the airway; and Figure 12 illustrates the appearance of the face of a cathode ray indicator aboard a craft flying on the airway system, such as that illustrated in Figure 11 of the drawings.

Referring now to the drawings in detail, and particularly to Figure 1 thereof, there is illustrated a master station M and a slave station $S_1$ separated by a distance D. The station $S_1$ may be located at a significant geographical position, such as, for example, an airport which a craft C may be approaching or from which said craft C may be receding. The station M is located in line with the airway along which the craft C may be constrained to fly. The craft C is assumed to be at a distance X from the station $S_1$.

The distance X may be determined in a number of different ways, in accordance with the present invention, all of which fundamentally involve the measurement of the time required for electromagnetic radiation to reach the craft C directly from the station $S_1$.

In one mode of practising my invention short pulses at a carrier frequency $f_0$ are periodically transmitted by the master transmitter 2 having an associated antenna 1, the transmitter being pulse-modulated by the modulator 3 which is supplied with pulse signals by a pulser 4.

Pulses transmitted by the master transmitter 2 may be intercepted by the antenna 5 and received and detected by the receiver 6, for supply to a slave transmitter 7, from which pulse modulated carrier energy is supplied to an antenna 8, for transmission on the same carrier $f_0$.

It will be obvious that the antennae 1 and 8 may be directional, if desired, to provide signals only within a given airway. It will further be obvious that the receiver antenna 5 must be adequately shielded from the transmitting antenna 8, in order that ringing may be avoided at the station.

In order to clarify the theory of operation of the system, let us assume that the pulse repetition rate in the system is $f$ pulses per second, or alternatively, that the pulse period $1/f$ is equal to T microseconds. Pulses will be transmitted from the master station M at times $nT$, where $n$ takes on the series of values corresponding to the integral numbers. These pulses will be received by the craft C, at distance $x$ from the slave station $S_1$, at times $$nT + \frac{D-x}{C}$$

where C is the speed of electromagnetic radiation in miles per microsecond and the distances D and $x$ are measured in terms of miles. Pulses received at the craft C via the slave station $S_1$ will arrive at times $$nT + \frac{D}{C} + \frac{X}{C}$$

The difference in time between the pulses received at the craft from the master station and from the slave station is then $$\frac{2X}{C}$$

and is independent of pulse rate and of distance between stations M and $S_1$. Various methods may be utilized to measure the time difference of reception of the pulses from the master and slave stations as will be hereinafter made evident.

Referring to Figure 2 of the drawings, there is illustrated one preferred mode of measuring the difference of time between pulses, and which is applicable to the system of distance measurement herein described. The first pulse of a pair of pulses, originating at a master station, such as the station M, and received at the antenna 12 aboard the craft C may be received and detected in the receiver 13, the pulse output of the receiver 13 being suitably amplified in the pulse amplifier 14a, if necessary, and thereafter applied to a flip-flop circuit 14, which may be of the Eccles-Jordan type. As is now well known in the art, the Eccles-Jordan type of flip-flop circuit has no natural period of its own but translates from one condition to another in response to successive pulses applied thereto. In the present application of the circuit the first of a pair of pulses is utilized to throw the circuit into a condition wherein a predetermined positive potential is provided at the output of the circuit 14, this potential remaining at its fixed value until the arrival of the second pulse of the pair, which returns the circuit to a quiescent condition, the potential reducing to zero. The shape of the output voltage of the flip-flop circuit 14, is indicated at 14c, and may be applied to an integrating circuit 14b, which in well known manner provides a continually increasing potential 14d so long as the square wave of voltage derived from the flip-flop circuit is applied thereto. Since the output voltage of the integrating circuit 14b is applied to a pair of plates 15 of a cathode ray indicator 16, the trace 16a provided on the face of the indicator will have a total length proportional to the maximum magnitude of the saw tooth voltage 14d and consequently of the length of the pulse 14c, which is equal in magnitude to the time difference between the control pulses applied to the flip-flop circuit 14.

In a further mode of measuring elapsed time between pulses, illustrated in Figure 3 of the drawings, the pulses are caused to produce vertical deflections of the horizontal sweep of a cathode ray indicator, and the distance between deflections provides a measure of distance. Means may be provided in such a system for translating the entire trace on the cathode ray indicator laterally, in order to enable alignment of the first of two indicated vertical pips with a zero marker on a scale calibrated in terms of distance, the second vertical pip being readable directly in terms of the required distance.

In the system illustrated in Figure 3 pulses are intercepted by the antenna 20, detected and amplified in the receiver 21, and applied to the vertical plate 22 of a cathode ray indicator 23. Simultaneously, the pulse provided at the output of the receiver 21 is applied to a circuit device 24 which clips and amplifies pulses to provide suitable synchronizing signals to a sweep generator 25. The output of the sweep generator 25 is applied to the horizontal plates 26 of the oscillograph 23, and the constants of the circuit as well as the character of the circuits are so chosen as to provide a sweep voltage which sweeps across the entire horizontal dimension of the screen of the oscilloscope in the time required for a pulse of electromagnetic energy to travel from the master station M to the slave station S and back to the master station M, and which is unaffected in its sweep by the advent of the second of a pair of received pulses.

In order to provide for adjustment of the starting point of the horizontal trace to coincide with the initial or zero point of a reference scale calibrated in terms of distance, and applied adjacent to the viewing face of the oscilloscope 23, there is provided an adjustment comprising the variable voltage source 27, in series with a resistor 28. The resistor 28 is connected via line 31 to one horizontal plate 26, of the indicator 23, the other horizontal plate being grounded at 30. The voltage of the source 27 may be adjusted to set the beam of the cathode ray indicator opposite the initial point of the aforementioned scale. Sweep signals applied to the resistor 28 via blocking capacitor 29 may be of suitable polarity and magnitude to overcome the voltage of the source 27 and laterally to deflect the beam of the indicator 23, as required.

Upon reception of the first of a pair of pulses, initiation of operation of the sweep circuit takes place, and simultaneously a vertical pulse is applied to the plate 22, resulting in a vertical pip on the viewing surface of the indicator. Reception of the second pulse does not modify the operation of the timing or sweep circuit, but merely produces a second pip at a point corresponding to distance of the craft C from the station S.

In still a further modification of the indicating system aboard the craft, illustrated in Figure 4 of the drawings and described below in detail, there is provided means normally biasing back the intensity of the cathode ray beam of the indicator. The advent of signal pulses is then utilized to intensify the beam without deflecting same, in order to provide a pair of dot indications on the face of the cathode ray indicator, rather than a pair of vertical pips, as is true of the embodiment of Figure 3 of the drawings.

Referring now specifically to Figure 4 of the accompanying drawings, the numeral 40 represents a receiving antenna, for receiving pulse signals transmitted by stations M and $S_1$, and which are detected in the receiver 41 and applied to circuit 42 to produce a synchronizing signal for the sweep generator 43. The generator 43, as was true in the embodiment of the invention illustrated in Figure 3 of the drawings, provides a sweep signal adequate to represent the distance between the stations M and S and which is unaffected by the advent of the second of a pair of associated pulses. Sweep voltages from the generator 43 are applied to the horizontal plate 44 of a cathode ray indicator 46, which, however, is provided with a de-intensifying voltage 51, applied to a control element 50 of the indicator 45. Pulse signals received and detected by the receiver 41 may be applied via coupling condenser 47 to the resistor 48 in such polarity as to produce thereacross a positive intensifying signal, of sufficient magnitude to overcome the continuously applied negative or de-intensifying voltage provided by the source of voltage 51.

Advent of the first of a pair of associated pulses will, accordingly, provide a zero or reference dot on the face of the indicator, advent of the second dot providing an indication of the distance of the craft C from the station X. Well known means may, of course, be provided for adjusting the trace of the indicator 45 laterally as well as vertically.

It will be obvious, so long as the craft C is located at a point intermediate the stations M and S, that the apparatus illustrated in Figures 2, 3 and 4 of the drawings will serve to locate the position of the craft. Should the craft in its travel from M toward S overshoot the point S, then pulses deriving from both M and S will have precisely the same distance to travel in arriving at the craft C, with consequent failure of distance indication, by reason of superposition of the pulses of each pair of pulses at the aircraft.

On the other hand, a craft traveling from S to M and which overshoots M by a distance L will receive pulses from the station M at times proportional to $$\frac{1}{c}$$

and from station S at times proportional to $$\frac{2D}{c}+\frac{1}{c}$$

The differences in time will be fixed and proportional to $$\frac{2D}{c}$$

Consequently, no true distance indication will be received except while the craft is between the stations M and S and on the proper airway.

In an application of the system to aerial navigation the station M may be located at one airport and the station S at another, between which the craft C flies. Alternatively, a series of master-slave stations may be located at relatively short intervals along an airway.

Provision of the properly calibrated screen for the cathode ray indicator will provide the pilot or navigator of the craft with a continual automatic indication of his position relative to any pair of stations, between which his craft may be traveling.

It will be realized that an aircraft, in traveling from an initial point to a destination may not travel a rectilinear course but may travel a series of angularly disposed courses. It is, in fact, extremely probable that future airways will be laid out to pass over cities or airports, just as do roads now provided for automotive traffic. In such case, a series of slave stations may be provided, each located at a city or airport, and as will be now demonstrated, the system of my invention may be utilized to guide an aircraft sequentially along a series of coterminous airways or segments of an airway, which may, if desired, be angularly disposed one to another, and the craft will be provided automatically and continuously with information as to its location.

Referring now again to Figure 1 of the drawings, there is illustrated a series of locations M, S₁M₁, S₂, which may be extended indefinitely if desired. The station M transmits pulses at a predetermined rate and at a carrier frequency $f_0$, these signals are received at the station S₁M₁, where they are retransmitted back toward station M, and are further heterodyned to a new frequency $f_1$, by means of a frequency converter 32 and transmitted toward station S₂ by the transmitter 33, the station S₁M₁ in this respect acting as a new master station for the slave station S₂. It will be obvious that this process may be continued indefinitely for any desired number of successive slave and master stations and that a series of such master-slave stations may be utilized to define an airway.

Figure 5 of the accompanying drawings illustrates a receiver adapted to be carried aboard an aircraft and utilizable in conjunction with the series of slave and master stations, each operating on a different frequency, such as is illustrated schematically in Figure 1 of the drawings. The receiver and indicator of Figure 5 is not only capable of measuring and indicating elapse of time between pairs of pulses but is further adapted to indicate simultaneously the frequency on which the pulses are being received, which serves as identification of the particular airway or airway segment along which the aircraft may be traveling at any given time.

Signals are received at the antenna 60, and amplified by the band-pass amplifier 61, which has a band-width sufficient to pass all signals originating in a series of airways utilizing the present type of system. Signals are then converted in the conterter and local oscillator 62 to an I. F. frequency having a value which may be efficiently amplified in the I. F. amplifier 63.

The output of the I. F. amplifier 63 is then analyzed by a panoramic circuit arrangement, and may consist of a second mixer 64 which is supplied with local oscillations from the oscillator 65. The latter is frequency modulated by means 66, which may be a reactance modulator controllable in response to signals generated in the sawtooth generator 67.

The elements 64, 65, 66, 67 serve to sweep through the band of frequencies translatable by the I. F. amplifier 63, and to provide an output signal in the I. F. amplifier 68, each time a signal is discovered, in accordance with principles now well understood, and explained in detail in Patent #2,367,907 issued to me January 23, 1945, and in the joint patent to Marcel Wallace and Horace G. Miller, #2,381,940 issued August 14, 1945.

Signals present in the I. F. amplifier 68 are detected by detector 69 and applied to the trigger circuit 14 and an integrating circuit 14b, to initiate and stop sweep voltage generation therein, as in the embodiment of the invention illustrated on Figure 2 of the drawings.

The time between pulses is short relatively to the time of sweep of the oscillator 65, whereby a plurality of pulse pairs may be applied to the trigger circuit 14 at any specific frequency and before the excursion of the oscillator 65 has proceeded for any appreciable frequency change. Accordingly a series of vertical sweep voltages are provided having a maximum value proportional to the distance of the craft C from a slave station S, and located horizontally across the face of the indicator at a position indicative of and identifying the pair of master-slave stations providing the indications to the craft at any given moment.

It will, of course, be obvious that types of indication such as were provided in Figures 2 to 4 inclusive of the drawings, may be utilized in the receiver-indicator of Figure 5. It will be further obvious that the embodiments of the invention illustrated in Figures 2 to 4 inclusive may be utilized in conjunction with a series of frequency-identifiable airways, or airway segments, by the simple expedient of manually tuning the receiver 12, Figure 2, the receiver 21 in Figure 3 and the receiver 41 in Figure 4 to a frequency in correspondence with that utilized in the airway over which the craft may be traveling at any particular time.

While it is possible, as has been stated in the previous paragraph, to tune pulse receivers manually for reception of each master-slave signal as the receiving aircraft travels on the associated airway or airway segment, it has been found to be extremely desirable to utilize the panoramic receiving system illustrated in Figure 5 of the drawings, since thereby a sequential series of master-slave stations may be indicated simultaneously. In the event a series of master-slave stations are located at equal intervals along a straight line course and transmitting in a sequentially increasing or decreasing series of frequencies, a series of vertical lines of equal and steady amplitude will be provided on the face of the cathode ray indicator, representative of a portion of the series of master-slave stations, and which will represent either a series of airway segments being approached or being left behind. The airway segment along which the craft may be momentarily traveling will be represented by a line of decreasing or increasing amplitude, depending on the direction of travel of the craft and the latter line will present a boundary condition, since on one side thereof on the face of the indicator will be presented the series of full length lines, previously mentioned and on the other side an expanse containing no lines at all.

The system of master-slave stations illustrated in Figure 1 of the drawings will not efficiently operate in conjunction with means for receiving signals simultaneously from a plurality of master-slave pairs, because of the directive character of the signals emitted. It is, in fact, required that each station, except the first and last stations on an airway, transmit bidirectionally, so that signals from each master and slave transmitter in the system provide signals along the entire airway.

Figure 11 is now referred to specifically for a description of a master-slave system, capable of providing multiple indications for an indicator analyzer system such as in disclosed in Figure 5 of the drawings. It is not to be understood that the receiver-indicator system of Figure 5 may not be utilized in conjunction with a system of master-slave stations in accordance with Figure 1, but merely that for simultaneous plural indications, such as are illustrated in Figure 12 of the drawings, the system of Figure 11 is preferred.

Should the craft veer off course the amplitude of all lines on the screen will change in amplitude simultaneously but not equally, which will provide the pilot of the craft with a certain indication that he was not flying directly along an airway.

On the other hand, any dog-legs present along the airway will be made evident in terms of a failure of reception of the directive radio beam originating at the dog-leg, and consequent failure of certain lines on the screen to materialize, thereby providing an indication of distance to the dogleg.

In Figure 11, a master station $M_0$ transmits on a frequency $F_0$ to a receiver $R_0$ which controls a transmitter $T_0$ for retransmission of the signal bi-directionally along the airway. The signal is further changed slightly in frequency and retransmitted in two directions along the airway, by the new master station $M_1$. This process may be repeated indefinitely, as is indicated in Figure 11, until a final station on the airway is reached which need be a slave repeater only, and need not provide a new master frequency, as is true of all intermediate stations along the airway.

In Figure 12 is illustrated the face of a cathode ray indicator in an aircraft, located about halfway between stations 1 and 2. The line 2 extends to a distance indicating that the craft is 12 miles from the station 2, and approaching same from the station 1. That the station 1 has been passed is indicated by the lack of indication at position 1 on the indicator. That stations 3, 4, 5 and 6 are being approached along the airway is indicated by the lines of positions 3, 4, 5 and 6, the length of each line, extending to the 20 mark on the distance scale, indicating that the stations are 20 miles apart. Failure of indication at the seventh position on the face of the indicator evidences, either that the airway terminates at station 6 or that a sharp bend in the airway occurs at station 6. Such information is of course of great utility to operators of aircraft.

As a craft approaches closer and closer to the station 2, the line at the 2 position in Figure 12 will diminish in extent, and as the craft passes over the station 2 will disappear entirely, and the line at position 3 will commence to diminish.

Of course, were the aircraft traveling from station 2 toward station 1, the indication at position 2, Figure 12, would increase in extent until it attained its maximum, at which point the craft would be over the station 1. Thereafter, an indication would appear and would gradually increase at position 1 of the cathode ray indicator.

It may prove desirable, in systems of the present type, to enable a traffic control operator located at any desired location to maintain a continuous watch over aircraft located in a selected airway. For this purpose signals must be transmitted from each aircraft to the control station, continuously and substantially instantaneously, the said signals bearing in any desired manner the required information.

In the embodiment of the present invention which is illustrated in Figure 2 of the drawings, it will be evident that the duration of the pulses produced by the multivibrator or sweep circuit 14 represents a measure of the distance of the craft from the slave station, and therefore may be utilized to represent the location of the craft with respect to any desired point on the airway the location of which with respect to the slave station is known. Each craft may be supplied with a transmitter the frequency of which differs in the case of each craft and which is characteristic of the said craft. The transmitter is normally adjusted to non-transmitting condition, but may be modulated to transmit pulses in response to signals derived from a multivibrator circuit, similar to multivibrator 14 of Figure 2 of the drawings.

At the ground control station may be provided a panoramic pulse analyzing instrument such as is disclosed in the co-pending application of Joseph I. Heller, Serial No. 644,512, filed January 31, 1946. With this instrument a continuous presentation may be provided of the pulse durations of all signals received within a given portion of the frequency spectrum. By arranging the transmission frequencies of the craft $C_1$, $C_2$, etc., to fall within the range of the panoramic pulse analyzing instrument, continual watch may be maintained over the simultaneous positions along an airway of a plurality of craft.

Such a system is illustrated in Figure 6 of the drawings, to which reference is now made, and wherein is illustrated a master station M and a slave repeater station S which provide pulses utilized at the receiver C for distance determination.

Pulse signals at frequency $f_0$ received at the aircraft receiver 70 are detected and applied to initiate sweep signal generation by a flip-flop generator 71, essentially similar to the Eccles Jordan flip-flop and integrating circuit indicated at 14 of Figure 2 and explained fully in connection with the detailed description of Figure 2, which is returned to quiescent condition in response to the second pulse of each pair. As has been explained above in great detail, a sweep voltage may be derived from the output of the flip-flop circuit 71 by an integration process, performed in the integrating circuit 71a, and applied to plates 72a of the cathode ray oscilloscope 72, the length of the produced trace being calibratable in terms of distance of the craft bearing the receiver C from the slave station S.

The multivibrator, in the course of its generating cycle, produces a square signal, which, after suitable amplification, may be applied as a modulating signal to the modulator 74. The transmitter 75 is normally in non-transmitting condition, and transmits signals only in response to energization by a pulse derived from the modulator 74. The transmitter 75 will, accordingly, transmit pulses, at some frequency $f_1$, different from $f_0$, the duration of said pulses being indicative of the distance of the aircraft from station S.

A monitor station may be provided with a panoramic receiving and pulse analyzing equipment, such as is illustrated and explained in detail in the co-pending application of Joseph I. Heller, Serial No. 644,512, filed January 31, 1946, and assigned to Panoramic Radio Corporation. This panoramic receiver-pulse analyzer is schematically indicated as comprising a band pass amplifier, local oscillator and frequency converter 75a, which applies signals to an I. F. amplifier 76 capable of passing the entire band of frequencies received at any one instant by the amplifier-oscillator-converter 75a, and supplying said signals to a panoramic pulse analyzer 77 which displays on a cathode ray indicator device the pulse lengths of all received pulses on one axis of the indicator, against carrier frequency on the other axis.

Since each aircraft C may be assigned a different transmitting frequency, which identifies the craft, and since each craft transmits pulses the lengths of which are indicative of location on an airway the monitor station P is continuously provided with complete information as to the identity and location of all aircraft on any given airway.

While I have illustrated a system in Figure 6 of the drawings wherein distinct carrier wave frequencies are assigned to each aircraft for identification purposes, it will be obvious that each aircraft may utilize the same carrier frequency, this carrier frequency being modulated by distinctive and identification serving sub-carriers, which may be pulse modulated in terms of distance and which may be applied, after separation from the main carrier at a station P, to a panoramic pulse and frequency analyzing equipment of the type disclosed in the previously mentioned patent application No. 644,512, filed in the name of Joseph I. Heller, on January 31, 1946.

It will, of course, be obvious that monitoring equipment, such as provided for the station P may be installed aboard each craft traveling along a given airway or airway segment to provide the various craft with information as to the location along the airway of all aircraft there present.

While in the embodiment of the invention illustrated in Figure 6 of the drawings, frequency of the carrier transmitted by each aircraft is utilized as a craft identification signal it is not essential that this should be so. Frequency may, for example, be utilized to identify the altitude at which aircraft may be flying. This object may be accomplished by controlling the frequency of transmission of the transmitter 75, Figure 6, in accordance with the setting of an aneroid cell, or other atmospheric pressure or altitude responsive device 90a, which controls a reactance tube modulator 78 for controlling the frequency of the transmitter 75 upon closure of the switch 91. A suitable transmitter arrangement for use in the system of Figure 6 of the drawings is illustrated in Figure 7 of the drawings, which includes the transmitter 75, pulse modulator 74, square wave generating flip-flop circuit 71, receiver 70, integrating circuit 71a and receiver 72 similar to the correspondingly designated elements in Figure 6. The transmitter 75 is tuned in respect to frequency by a reactance tube modulator 78, which transforms potentials applied thereto into frequency changes at the transmitter 75. In the present instance, frequency is controlled in accordance with an aneroid cell 79, which adjusts the arm 80 of a potentiometer 81, consisting of a source of potential 82 and a resistor 83 in series therewith.

Each craft C will now transmit pulses the lengths of which correspond to distances from a fixed point along a fixed path, and at a frequency corresponding to the altitude of the craft.

It may be desired to provide still further information, in addition to distance and altitude, and this is made readily possible by the addition of a coding wheel 84 which makes and breaks the circuit to the pulse modulator 74 slowly in accordance with any desired code, by opening and closing a switch 85 in series with said circuit.

The wheel 84 may be provided with raised surfaces 87, corresponding to information bearing elements of the wheel, for controlling a cam follower 88, which mechanically opens and closes the switch 85. An electric motor or clock 86 may be utilized for actuating the wheel 84.

On the periphery of the wheel 84 may be provided information in code form, as to the identity of the transmitting craft and of its sense of travel along the airway involved. For example, if travel is toward a given slave transmitter a wheel provided with a series of dots may be transmitted, whereas if travel is away from that slave station a series of dashes may be transmitted by means of an appropriate wheel 84. Following the series of dots or of dashes, a code letter or a pair of letters of the alphabet may be transmitted to identify the transmitting aircraft.

At the panoramic pulse analyzing equipment, 77, which may be located aboard a ground monitoring station and also aboard each craft in the air, the keying operation will result in a fading and re-establishment of the various distance-altitude lines on the display surface of the panoramic pulse analyzing equipment, in coded tempo.

It will, of course, be obvious that a desirable type of display in the present application will be one in which frequency is the ordinate, corresponding to altitude, and in which pulse length is the abscissa, corresponding to distance. In connection with such a display, illustrated at 77a in Figure 6, it is further desirable to present the altitude information, in terms of relative altitude. For this purpose, it is desirable that each craft carry its own altitude distance line 77b at the center of the display screen, lines corresponding to the other craft being indicated above or below the center line, as at 77c and 77d, in accordance with whether the relative altitudes of the other aircraft are greater or less than that of the aircraft carrying the display. This objective may be readily accomplished by tuning the band pass amplifier, mixer, and local oscillator 75a to a central frequency corresponding at all times to its own transmitter frequency, and to this end the local oscillator circuit, Figure 6, may be provided with a reactance control tube 89 provided with control voltage from any altitude responsive control voltage generator 90, similar to that utilized in Figure 7 hereof, and which may be included in the circuit of the local oscillator included in circuit element 75a by closure of a switch 91.

While I have disclosed one mode of maintaining the transmitter 75 and the receiver 75a in operation on identical frequencies, many systems and circuits for accomplishing this object are known to the art, and may be utilized as desired in the practice of my invention. In this connection it will, of course, be evident that the frequency of the receiver 75a must be constrained to follow that of the transmitter 75, since the transmitted frequencies are significant of altitude.

In still a further embodiment of the invention, similar in some respects to the embodiment illustrated in Figure 6 of the drawings, there may be utilized in conjunction with a master and slave pulsing system, such as is disclosed in Figure 1 of the drawings, a receiver-indicator system for translating time elapse between pulses. The system, the transmitter-receiver of which is illustrated in Figure 8, may involve a receiver 70 for receiving, amplifying and detecting pulses, the pulse output of the receiver being applied to a flip-flop or multivibrator such as 71, and an integrating circuit 71a, to produce a sweep voltage for the indicator 72. The first of a pair of received pulses serves to initiate sweep voltage generation in the multivibrator 71 and the second of the pair to return the multivibrator to quiescent condition, in preparation for the reception of a further pair of pulses. It will be obvious, in such case, that the maximum voltage attained in the course of the build up of the sweep voltage of the multivibrator 71 will correspond to time elapse between pulses and consequently provides a measure of the required distance. The sawtooth voltage output of the generator 71 may be supplied to a rectifier and filter circuit 93 which produces at its output a smoothed D. C. voltage having a magnitude which is proportional to the peak output of the flip-flop or multivibrator 71, and consequently to distance.

The D. C. output of the rectifier filter 93 may be applied to a reactance tube modulator 94 which serves to determine the frequency of transmission of the transmitter 95.

The range of frequencies within which the transmitter 95 may be constrained to operate may be selected in such fashion as to fall within the band $f_1$ to $f_2$, inclusive. Panoramic receivers 96 having cathode ray indicators 97 and of the type disclosed in the Wallace Patent No. 2,367,907 and in the Wallace et al. Patent No. 2,381,940, and suitable for reception in the band $f_1$ to $f_2$ inclusive or in any preselected portion of that band, may be utilized at a ground monitor station as well as aboard the several aircraft in an airway, to indicate the presence and the frequencies of all signals emanating from several aircraft, thereby to provide a continuous indication of relative distances of the aircraft.

For convenience of indication it may be desirable to control the central frequency to which the panoramic receiver aboard a given craft may be tuned, to maintain same at all times equal to that of the transmitter 95 aboard that same craft. This may be readily accomplished by applying to the local oscillator tuned circuit of the panoramic receiver a reactance tube modulator 98 for varying the frequency of the tuned circuit. By applying to the reactance tube modulator 98 the same control potential as is applied to the modulator 94 to serve as a transmitter frequency control, it is possible to maintain the tuning of the receiver 93 at all times similar to the tuning of the transmitter 95.

In this manner the indicator 97 will display at all times the signal corresponding with its directly associated receiver at the center of a screen, and the signals corresponding to all other distance-significant transmissions will be displayed to the left or the right of the centrally displayed signal in accordance not only with relative distance but also with relative orientation along the airway with respect thereto.

While I have disclosed, in Figure 8 of the drawings, a system in which the transmitted frequency of the transmitter 95 is varied in accordance with a distance-significant quantity, it will be obvious that a similar result may be attained by maintaining the frequency of the transmitter 95 constant and utilizing a frequency modulated sub-carrier as the carrier of distance-significant information. At the receiver the sub-carrier may be abstracted from its associated carrier and applied to the input of a panoramic receiver for determination and indication of its relative frequency.

While I have disclosed a plurality of navigational systems all of which are based fundamentally upon measuring the elapse of time between two pulses, one originating at a master station and the other at a slave repeater station, to determine distance, it is possible to accomplish the measurement of distance by measuring the frequency difference between transmitted signals of a master and slave repeater station, the master station providing transmission on a frequency modulated carrier.

Referring now to Figure 9 of the accompanying drawings, there is provided a master station $M_r$ which transmits signals frequency modulated in linear saw tooth fashion between the limits $F_A$ and $F_B$, the modulation requiring a time T to pass through one complete cycle of values.

A slave repeater station $S_r$ may be located at a distance D from the master station $M_r$, and may be enjoined to operate in frequency synchronism with the station M, by any of the various means available for this purpose. It is to be understood that the slave and master stations, $S_r$ and $M_r$ respectively are not intended to transmit precisely the same frequency at any given instant of time, but that a difference of transmitted frequency will exist, as between the two stations, by virtue of the time required for control signals to reach the station S from the station M, the said difference of transmitted frequency being expressible as $$\frac{dF}{dt}\frac{D}{c}$$

where $$\frac{dF}{dt}$$

is expressed in cycles per microsecond of frequency modulation, D is the distance between master and slave stations and c is the speed of electromagnetic radiation in miles per microsecond. Obviously for linear frequency modulation $$\frac{dF}{dt}$$

is a constant, and may be denoted by the letter $m$.

At a point intermediate the stations $M_r$ and $S_r$ and in line therewith, at a distance X from the station S, a suitable receiver C will discover frequencies $$F+m\frac{D-x}{c}$$

derived from the station $M_r$ and $$F+m\frac{D+x}{c}$$

derived from the station $S_r$, where F is an instantaneous frequency at the station M. A receiver is provided which is capable of measuring the difference in the two received frequencies, this difference being equal to $$\frac{2X}{c}$$

and being dependent solely upon the distance of the receiver $c$ from the slave repeater S.

Should the aircraft in its flight along the airway pass over the slave station S, it will thereafter receive signals at precisely the same frequency from both the master and the slave stations, and hence indication of distance will fail.

On the other hand should the aircraft pass beyond the station M by a distance $l$ it will receive frequencies differing by a distance corresponding to twice the distance between the master and the slave stations, the frequency derived from the station S being $$F - m\frac{1}{c}$$

and the frequency derived from the station S being $$F + 2m\frac{M}{c} + \frac{1}{c}$$

and the difference frequency being $$2m\frac{M}{c}$$

It is thus evident that my novel system produces accurate distance indications while the aircraft is on a given airway between a master and a slave or repeater station, and that indications provided should the craft overshoot the ends of the airway will not be capable of misleading an operator of the craft as to the true location of the craft.

It will, of course, be readily possible to provide a plurality or network of airways by providing a series of distinctive pairs of master and slave stations for each airway or airway segment, each pair operating in a different frequency range. Operators of aircraft may be informed of the characteristic frequency ranges of the various airways by means of suitable publications.

Restricting ourselves for the moment to consideration of a single airway or airway segment, it will be desirable for each craft to be apprised not only of its own location on the airway but also of the locations of all other craft which may be suitably equipped. For this purpose it is necessary that each craft be provided with a radio transmitter the frequency of transmission of which varies in accordance with the location of the craft. Alternatively a single carrier may be utilized which shall be suitably modulated with signals, a characteristic of which depends upon the location of the craft. The characteristic above referred to preferably corresponds to the frequency of the modulation.

In Figure 9 of the drawings, there is illustrated a master station $M_r$ having a transmitter 100 modulated in frequency by a reactance tube modulator 101 the latter being controlled in respect to the maximum deviation and the velocity of modulation by a sawtooth oscillator 102.

Located at a point remote from the station $M_r$ is a slave repeater station $S_r$ comprising an oscillator circuit 103 which automatically transmits in correspondence with received frequency. Such a repeater station has been disclosed to the art in the Patent #2,183,562, issued in the name of Hansell on December 19, 1939.

While I have disclosed or suggested one simple form of frequency repeater which is capable of remaining in precise synchronism with a received frequency modulated signal, it is to be understood that many such systems exist, and may be utilized in the practice of the present invention.

An aircraft flying between and in line with the stations $M_r$ and $S_r$, and receiving simultaneously the pair of signals, one from the station $M_r$ and the other from the station $S_r$, on a suitable receiver will be apprised of its distance from the station S by measuring the frequency difference of the pair of signals. This may be most readily accomplished by amplifying the signals in a broad band amplifier 104, and thereafter applying the signals to a heterodyne circuit 105 having an output filter circuit 106 which is selective to frequencies in the range desired. The signal present in the output of the filter 106 may be applied to a frequency discriminator circuit 107 whereby to produce an output signal having an amplitude corresponding to the measured frequency. The output signal of the discriminator 107 may be suitably filtered and smoothed and applied as a control voltage to a reactance tube modulator 108 for controlling the frequency of transmission of a transmitter 109. This transmission signal frequency represents distance of the transmitting craft from the station $M_r$, and the signals transmitted by all the craft may be received aboard each craft and simultaneously analyzed by means of a panoramic receiver 110 having an oscilloscope indicator 111 installed aboard each craft. The indicator face of the oscilloscope which normally forms part of a panoramic adaptor may be calibrated in terms of distance, so that all indications may be directly read in terms of their distance significance aboard the craft C.

The transmissions provided by the transmitter 109 may be pulse modulated by a modulator 112 to provide altitude information, if desired. In such case reception may be provided on a panoramic pulse analyzer, of the type disclosed in the co-pending application for U. S. patent of Joseph I. Heller No. 644,512, filed January 31, 1946.

Figure 10 illustrates schematically a simple device for pulse modulating the output of the transmitter 109 in accordance with the altitude, it being understood that the transmitter 109 of Figure 9 may be a transmitter such as disclosed in Figure 10.

Having particular reference to Figure 10 of the drawings, there is illustrated a transmitter 109, with its output connected to an antenna 113 and modulated in respect to frequency by the reactance tube modulator 108. The further amplitude modulator 114 is connected to the transmitter 109 in such fashion as to modulate the amplitude thereof, it being understood that the transmitter 109 is normally adjusted to produce no signals at the antenna 113 in the absence of modulating signals.

Modulating signals are applied to the transmitter modulator 114 by deriving voltage pulses originating at a battery 115 and interrupted to produce pulses which are proportional in length to altitude. A cylinder 116 constructed of insulating material is provided having its top 117 coated with metal or other conducting material and having a further coating of conducting material applied to the cylindrical surface thereof in the outline of a triangle 118 having its apex adjacent to the base of the cylinder. A brush 119 rides on the surface of the cylinder at a point along a generating element of the cylinder 116 determined by an aneroid cell 120, which actuates the brush 119 parallel to the said generating element.

It will be evident that pulses having a duration dependent upon the altitude of the craft may be provided at the brush 119 which may be connected to the modulator 114 in such fashion as to apply thereto the produced pulses, by the simple expedient of rotating the cylinder 116 at some convenient speed of rotation by means of a motor 121.

While I have described and illustrated various modifications of a navigational system, and various expedients useful in such systems, it is to be understood that rearrangement of the various combinations, and variations in the expedients, may be resorted to without departing from the spirit of the invention, as defined in the appended claims.

What I claim and desire to secure by Letters Patent of the United States is:

1. In combination, means for providing aboard an aircraft a pair of pulses separated in time by an interval representative of a distance, means responsive to said pulses for generating further pulses having each a duration proportional to said interval, means for generating aboard said aircraft oscillations having a frequency dependent on altitude of said aircraft, means for transmitting said oscillations in response to each of said further pulses and for the durations thereof, means for receiving said oscillation at a remote location, means at said remote location responsive to said oscillations when received for indicating the value of said frequency and the durations of said further pulses.

2. The combination in accordance with claim 1 wherein said means for indicating comprises a cathode ray tube indicator having means for generating a separate visual trace in response to each further pulse having a length proportional to the duration of each further pulse and a position corresponding with the value of said frequency.

3. In combination, means for providing aboard each of a plurality of aircraft a pair of pulses separated in time by an interval representative of distance of said aircraft from a geographic location, means at each of said aircraft responsive to said pulses for generating further pulses having each a time characteristic representative of said interval, means aboard each of said aircraft for generating oscillations having a frequency dependent on altitude of said aircraft, means for transmitting said oscillations from each of said aircraft only during said further pulses, means for receiving said oscillations at a remote point, means at said remote point responsive to said oscillations when received for indicating the altitudes and the distances of said aircraft from said geographic location.

4. The combination in accordance with claim 3 wherein said means for indicating comprises a panoramic pulse analyzer having means for visually indicating the time characteristics and the frequencies of each of said oscillations when received.

5. The combination in accordance with claim 3 wherein said time characteristic is duration and said means for indicating comprises a cathode ray tube indicator having means for generating a cathode ray beam, means for displacing said beam in one direction in accordance with the duration of each of said pulse oscillations to provide indications of durations of said further pulses, and means for displacing each of said indications in another direction in accordance with frequency of the pulsed oscillation giving rise to the indication.

6. In a navigational system, means aboard an aircraft for generating a carrier wave having a frequency representative of altitude of said aircraft, means for generating pulses having a characteristic representative of range of said aircraft from a predetermined geographic location, means for pulse modulating said carrier wave in response to said pulses to provide carrier wave pulses, means for further modulating each of said carrier wave pulses to represent identity of said aircraft, and means for transmitting said carrier wave pulses.

7. The combination in accordance with claim 6 wherein is further provided means at a remote point for receiving said carrier wave pulses and for translating said carrier wave pulses into a visual indication of said range, and said identity.

8. The combination in accordance with claim 6 wherein is further provided a cathode ray tube indicator means for visually presenting a single visual indication representative simultaneously of said range and said identity.

9. In a navigational system, means aboard an aircraft for generating a carrier wave having a frequency representative of altitude of said aircraft, means for generating pulses having a characteristic representative of range of said aircraft from a predetermined location, means for pulse modulating said carrier wave in response to said pulses to provide pulsed carrier signals, and means for transmitting said pulsed carrier signals to a remote location.

10. The combination in accordance with claim 9 wherein means are provided at said remote location for translating said pulsed carrier signals into a visual indication of range and altitude of said aircraft.

11. The combination in accordance with claim 3 wherein said first means comprises a master transmitter for transmitting periodic pulses, a slave station separated from said master transmitter along an airway, said slave station comprising means for repeating each of said periodic pulses, and a receiver aboard each of said aircraft for receiving said pulses, said aircraft flying on said airway between said master transmitter and said slave station.

12. In combination, means for providing aboard each of a plurality of aircraft a pair of pulses separated in time by an interval representative of distance of said aircraft from a geographic location as a first navigational quantity, means at each of said aircraft responsive to said pulses for generating further pulses having time characteristic representative of said interval, means aboard each of said aircraft for generating signals in response to said further pulses which are representative of said distances, means for transmitting said signals from each of said aircraft, means for generating aboard each of said aircraft further signals representative of altitude of said aircraft as a second navigational quantity, means for transmitting said further signals from each of said aircraft, said first and further signals consisting of pulsed wave energy, the pulses of said pulsed wave energy comprising each a frequency representative of one of said navigational quantities and a time characteristic representative of the other of said navigational quantities.

13. In a navigational system, means aboard an aircraft for generating a carrier wave having a frequency representative of a first navigational quantity pertaining to said aircraft, means for generating pulses having a pulse characteristic representative of a second navigational quantity pertaining to said aircraft, means for pulse modulating said carrier wave in response to said pulses to provide pulsed carrier signals, and means for transmitting said pulsed carrier signals to a remote location, said navigational quantities being aircraft altitude and distance of said aircraft from a predetermined location.

MARCEL WALLACE.

REFERENCES CITED

The following references are of record in the file of this patent:

UNITED STATES PATENTS

| Number | Name | Date |
|---|---|---|
| 1,562,485 | Affel | Nov. 24, 1925 |
| 2,252,083 | Luck | Aug. 12, 1941 |
| 2,279,246 | Podliasky et al. | Apr. 7, 1942 |
| 2,288,196 | Kramar | June 30, 1942 |
| 2,378,604 | Wallace | June 19, 1945 |
| 2,403,527 | Hershberger | July 9, 1946 |
| 2,403,603 | Korn | July 9, 1946 |
| 2,403,626 | Wolff et al. | July 9, 1946 |
| 2,405,231 | Newhouse | Aug. 6, 1946 |
| 2,405,238 | Seeley | Aug. 6, 1946 |
| 2,407,287 | Labin | Sept. 10, 1946 |
| 2,408,048 | Deloraine et al. | Sept. 24, 1946 |
| 2,412,111 | Wilson | Dec. 3, 1946 |
| 2,416,333 | Lehman | Feb. 25, 1947 |
| 2,419,525 | Alford | Apr. 29, 1947 |
| 2,420,516 | Bischoff | May 13, 1947 |
| 2,428,058 | Wise | Sept. 30, 1947 |
| 2,433,283 | Luck | Dec. 23, 1947 |
| 2,471,416 | Deloraine et al. | May 31, 1949 |
| 2,480,123 | Deloraine et al. | Aug. 30, 1949 |
| 2,495,722 | Hoffman et al. | Jan. 31, 1950 |
| 2,513,282 | Busignies | July 4, 1950 |

OTHER REFERENCES

Electronic Engineering, October 1945, pages 713 to 716.